United States Patent
Lee et al.

(10) Patent No.: US 9,311,719 B2
(45) Date of Patent: Apr. 12, 2016

(54) IMAGE MONITORING APPARATUS FOR ESTIMATING GRADIENT OF SINGLETON, AND METHOD THEREFOR

(71) Applicant: SK TELECOM CO., LTD., Seoul (KR)

(72) Inventors: Gwang-gook Lee, Seongnam-si (KR); Ki-mun Kim, Seongnam-si (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 14/682,841

(22) Filed: Apr. 9, 2015

(65) Prior Publication Data

US 2015/0213624 A1    Jul. 30, 2015

Related U.S. Application Data

(63) Continuation of application No. PCT/KR2013/009068, filed on Oct. 10, 2013.

(30) Foreign Application Priority Data

Oct. 9, 2012    (KR) .................. 10-2012-0112115

(51) Int. Cl.
*G06K 9/00* (2006.01)
*G06T 7/40* (2006.01)
(Continued)

(52) U.S. Cl.
CPC ............. *G06T 7/408* (2013.01); *G06T 7/004* (2013.01); *G06T 7/0042* (2013.01); *G06T 7/0081* (2013.01); *G06T 2207/10016* (2013.01); *G06T 2207/20144* (2013.01);
(Continued)

(58) Field of Classification Search
CPC ................... G06T 7/00; G06K 9/00
USPC .......... 382/103, 107, 236; 348/169, 170, 171, 348/172, 352
See application file for complete search history.

(56) References Cited

U.S. PATENT DOCUMENTS 6,408,428 B1 * 6/2002 Schlansker ......... G06F 17/5045
716/104

FOREIGN PATENT DOCUMENTS

KR    1020080018785 A    2/2008
KR    1020080051956 A    6/2008
(Continued)

OTHER PUBLICATIONS

International Search Report for PCT/KR2013/009068 dated Jan. 6, 2014.

*Primary Examiner* — Abolfazl Tabatabai
(74) *Attorney, Agent, or Firm* — Hauptman Ham, LLP

(57) ABSTRACT

An image monitoring apparatus includes: a singleton selector selecting at least one singleton from a plurality of objects in an image; a single foreground image generator generating a single foreground image of the singleton; an eigenvector extractor extracting an eigenvector of a foreground singleton contained in the single foreground image using at least one of a centroid of the foreground singleton, the number of pixels of the foreground singleton and coordinate values of the pixels; a vanishing point location calculator generating a reference vector by connecting a predetermined point in the image to the centroid of the foreground singleton, and determining the predetermined point as a vanishing point when the predetermined point minimizes an angle between the reference vector and the eigenvector; and a gradient determiner determining a gradient of the foreground singleton using the vanishing point, and correct an inclination of a bounding box of the foreground singleton.

14 Claims, 14 Drawing Sheets

(51) Int. Cl.
  *G06T 7/00* (2006.01)
  *H04N 5/225* (2006.01)

(52) U.S. Cl.
  CPC ............... *G06T 2207/30196* (2013.01); *G06T 2207/30232* (2013.01); *G06T 2210/12* (2013.01)

(56) References Cited

FOREIGN PATENT DOCUMENTS

| KR | 1020080060007 A | 7/2008 |
| KR | 1020080085655 A | 9/2008 |
| KR | 101035291 B1 | 5/2011 |

* cited by examiner

IMAGE MONITORING APPARATUS FOR ESTIMATING GRADIENT OF SINGLETON, AND METHOD THEREFOR

CROSS-REFERENCE TO RELATED APPLICATION

The present application is a continuation of International Patent Application No. PCT/KR2013/009086, filed Oct. 10, 2013, which is based on and claims priority to Korean Patent Application No. 10-2012-0112115, filed on Oct. 9, 2012. The disclosures of the above-listed applications are hereby incorporated by reference herein in their entirety.

TECHNICAL FIELD

The present disclosure in some embodiments relates to an image surveillance or monitoring apparatus and method for estimating the gradient of a singleton.

BACKGROUND

The statements in this section merely provide background information related to the present disclosure and do not necessarily constitute prior art.

Sizes of objects in an image are often used to enhance accuracy of an image analysis algorithm of an image monitoring system. For example, when only humans are set as objects-of-interest, approximate sizes of humans are preset in the system such that nonhuman objects (animals, vehicles, etc.) are excluded from target objects to detect.

The inventor(s) has noted that to estimate the size of an object, precise camera calibration is needed. The inventor(s) has noted that such precise camera calibration requires complex processing and is thus not proper for practical use.

The inventor(s) has noted that the size of an object in an image on the image monitoring system varies depending on the coordinates thereof in the image due to perspective effect. The inventor(s) has noted that known technology involves a user in person to input the size of an object-of-interest at a few different points in an image, perform interpolation on the object size information inputted in order to estimate and use the size of the object at each coordinate in the image.

The inventor(s) has noted that the result obtained through this method varies according to the sample that the user inputs, and therefore the accuracy of the system depends on the competence level of the user. The inventor(s) has experienced that to apply the method requiring inputs from the user to a large-scale system which employs multiple cameras, a lot of labor is necessary.

The inventor(s) has noted that the image monitoring technology only counts on the size of an object. The inventor(s) has also noted that the pose of an object plays an important role in improving the accuracy of an algorithm. For example, in a region-based algorithm for estimating the number of people, the area that a person occupies in an image plays a very important role as a scaling factor. The inventor(s) has experienced that when the posture of the person is slanted, the size of the minimum bounding rectangle or box of the corresponding object greatly differs from the actual area of the object, which will degrade the accuracy of the algorithm. Further, the inventor(s) has experienced that when a recognition-based technique is used, the recognition performance is degraded unless an object is input making the same pose as the image used for a classifier in the learning process for recognition.

SUMMARY

In accordance with some embodiments of the present disclosure, an image monitoring apparatus includes a singleton selector, a single foreground image generator, an eigenvector extractor, a vanishing point location calculator and a gradient determiner. The singleton selector is configured to select at least one singleton from among a plurality of objects in an acquired image. The single foreground image generator is configured to generate a single foreground image of the singleton. The eigenvector extractor is configured to extract an eigenvector of a foreground singleton contained in the single foreground image by using at least one selected from the group consisting of (i) a centroid of the foreground singleton, (ii) the number of pixels of the foreground singleton and (iii) coordinate values of the pixels. The vanishing point location calculator is configured to generate a reference vector by connecting a predetermined point in the acquired image to the centroid of the foreground singleton and to determine the predetermined point as a vanishing point when the predetermined point minimizes an angle between the reference vector and the eigenvector. The gradient determiner is configured to determine a gradient of the foreground singleton using the vanishing point and to correct an inclination and a size of a bounding box of the foreground singleton.

In accordance with another embodiment of the present disclosure, an apparatus for measuring a gradient of a singleton in an image by an image monitoring apparatus is configured to perform a method including: selecting at least one singleton from among a plurality of objects in an acquired image; generating a single foreground image of the at least one singleton; extracting an eigenvector of a foreground singleton contained in the single foreground image using at least one selected from the group consisting of (i) a centroid of the foreground singleton, (ii) the number of pixels of the foreground singleton and (iii) coordinate values of the pixels; generating a reference vector by connecting a predetermined point in the acquired image to the centroid of the foreground singleton and determining the predetermined point as a vanishing point when the predetermined point minimizes an angle between the reference vector and the eigenvector; and determining a gradient of the foreground singleton using the vanishing point and correcting an inclination and a size of a bounding box of the foreground singleton.

DETAILED DESCRIPTION

Figure 1:
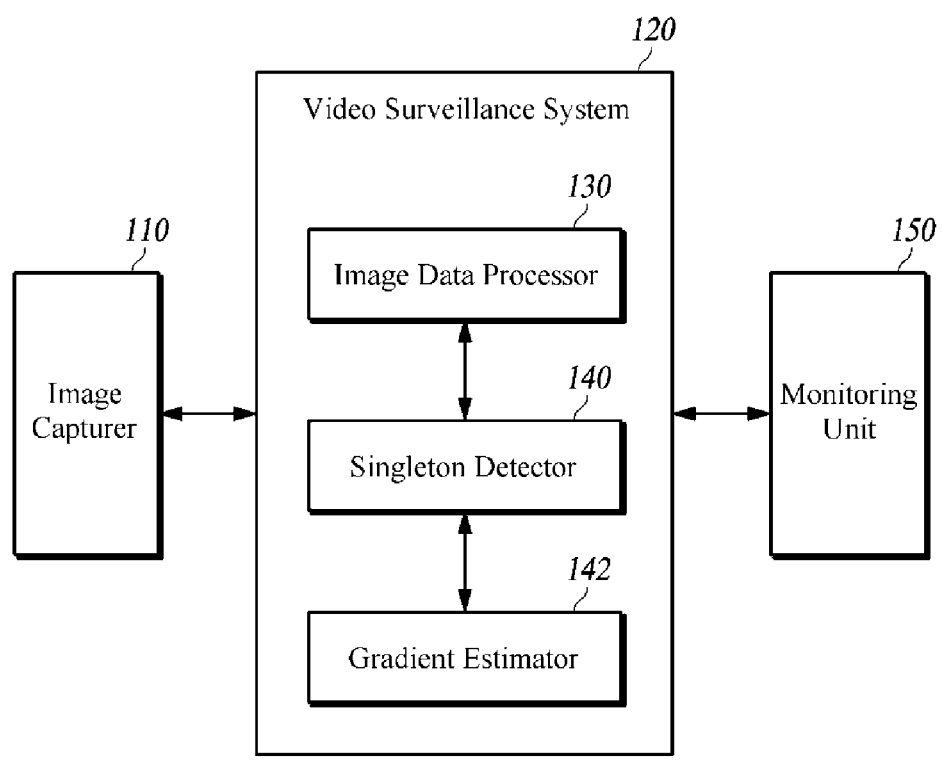
FIG. 1 is a schematic block diagram of a video image monitoring apparatus according to at least one embodiment of the present disclosure.

Hereinafter, various embodiments of the present disclosure will be described in detail with reference to the accompanying drawings. In the following description, like reference numerals designate like elements although the elements are shown in different drawings. Further, in the following description of the at least one embodiment, a detailed description of known functions and configurations incorporated herein will be omitted for the purpose of clarity and for brevity.

Additionally, in describing the components of the present disclosure, terms like first, second, A, B, (a), and (b) are used. These are solely for the purpose of differentiating one component from another, and one of ordinary skill would understand that the terms are not to imply or suggest the substances, order or sequence of the components. If a component is described as "connected", "coupled", or "linked" to another component, one of ordinary skill in the art would understand the components are not necessarily directly "connected", "coupled", or "linked" but also are indirectly "connected", "coupled", or "linked" via a third component.

Some embodiments of the present disclosure provide an image monitoring apparatus and method for estimating the gradient or pose of a singleton by detecting the singleton through estimating the areas, widths and heights of objects in a captured image, extracting an eigenvector of the singleton and calculating the location of a vanishing point based on the extracted eigenvector.

FIG. 1 is a schematic block diagram of a video image monitoring apparatus according to at least one embodiment of the present disclosure.

According to some embodiments of the present disclosure, a video surveillance system for estimating the gradient of a singleton includes an image capturer 110, an image monitoring apparatus 120 and a monitoring unit 150. Herein, the image monitoring apparatus 120 includes an image data processor 130, a singleton detector 140 and a gradient estimator 142. Other components of the video surveillance system, such as each of the image capturer 110, the image monitoring apparatus 120 and the monitoring unit 150 is implemented by, or includes, one or more processors and/or application-specific integrated circuits (ASICs). The video surveillance system comprises input units such as one or more buttons, a touch screen, a mic and so on, and output units such as a display, an indicator and so on.

The image capturer 110 refers to a device capable of capturing images. According to some embodiments, the image capturer 110 is implemented as a closed—circuit television (CCTV) camera, a video surveillance camera, and the like which are capable of capturing images to monitor moving objects of a predetermined size. The image capturer 110 transmits the captured images for monitoring moving objects to the image monitoring apparatus 120 in order to monitor moving objects in the captured images. An image captured by the image capturer 110 is one frame. However, embodiments of the present disclosure are not limited thereto. The captured image includes a plurality of frames.

The image monitoring apparatus 120 is a device for receiving captured images from the image capturer 110 and monitoring the images by detecting whether there is a moving object of a predetermined size in the captured images.

The image data processor 130 receives a captured image from the image capturer 110, determines pixel values of pixels in the captured image, and generates a foreground image through separating foreground pixels of the moving objects from the captured image by removing background pixels for a background, which does not exhibit a designated movement, in the captured image. In addition, the image data processor 130 generates foreground object information by measuring (i) the number of pixels of the foreground objects in the separated foreground image and (ii) coordinate values of the foreground pixels. Herein, when the amount of data of the foreground object information is less than a predetermined reference data amount, the image data processor 130 repeatedly measures (i) the number of pixels of the foreground objects and (ii) the coordinate values of the foreground pixels based on a predetermined time and data amount to generate foreground object information. Herein, in some embodiments of the present disclosure, a "foreground object" indicates generally a moving object in a captured image as opposed to so-called "background image." And "foreground pixels" indicates pixels of the foreground object corresponding to the moving object in the captured image. Further, "foreground objects" correspond to a plurality of moving objects in the captured image.

The singleton detector 140 denoises the foreground object information generated by the image data processor 130, and clusters the denoised foreground object information into two groups by using the foreground object information. Then, the singleton detector 140 determines whether a group including singletons exists among the two groups and detects singleton information on the singletons included in the determined group. In addition, the singleton detector 140 estimates a predetermined area calculation function by using the singleton information, and calculates an area, a width, and a height of each singleton by applying the y coordinate values of the singletons contained in the singleton information. Thereby, the singleton detector 140 generates information on the sizes of the singletons.

The gradient estimator 142 selects a predetermined foreground singleton based on the resulting singleton information generated by the singleton detector 140, and estimates the gradient or posture of the selected foreground singleton to correct the size of the minimum bounding box and the gradient of the foreground singleton. The bounding box is a quadrangle in the shape of a box, but embodiments of the present disclosure are not limited thereto. The bounding box has the shape of ellipse, circle, triangle, and the like in place of the quadrangular shape. Herein, the minimum bounding box means the minimum size of a bounding box which can include therewithin the foreground singleton.

According to some embodiments of the present disclosure, the gradient estimator 142 selects a foreground singleton from among the singletons whose area, width and height have been calculated, according to an administrator's initiated setup value or a predetermined reference size, and extracts the eigenvector of the selected foreground singleton by using a covariance matrix. In addition, the gradient estimator 142 calculates, as the location of a vanishing point, a certain point in a captured image that minimizes the angle between a reference vector generated by connecting the point to the centroid of the foreground singleton and the extracted eigenvector. Herein, the gradient estimator 142 repeatedly sets some or all of the pixels in the captured image as the certain point to calculate the location of the vanishing point. In addition, the gradient estimator 142 determines the gradient, namely the pose of each foreground singleton by using the calculated vanishing point. With the gradient, the gradient estimator 142 adjusts the inclination of the minimum bounding box of the object, and displays the minimum bounding box on the monitoring unit 150 after correcting the size of the minimum bounding box so as to be similar to the actual size of the object.

The monitoring unit 150 refers to a device on which the foreground singletons is displayed in which each of the foreground singletons is estimated by the image monitoring apparatus 120 in various shapes such as a quadrangle, an ellipse and a triangle after correcting at least one of the inclination, the area, the width and the height of each of the minimum bounding boxes of each of the foreground singletons based on the gradients of the foreground singletons.

While the monitoring unit 150 is illustrated as displaying only singletons, the object to be displayed is diverse according to configurations set up by the administrator (e.g., administrator's preference or administrator's policy). In addition, the monitoring unit 150 is implemented so as to perform short-range communication through, for example, Wireless LAN, Bluetooth, or ZigBee to receive information on the singletons from the image monitoring apparatus 120. While the monitoring unit 150 is illustrated as being implemented independent of the image monitoring apparatus 120 in FIG. 1, embodiments of the present disclosure are not limited thereto. The monitoring unit 150 and the image monitoring apparatus 120 is implemented by a single device with a display incorporated into the image monitoring apparatus 120.

Figure 2:
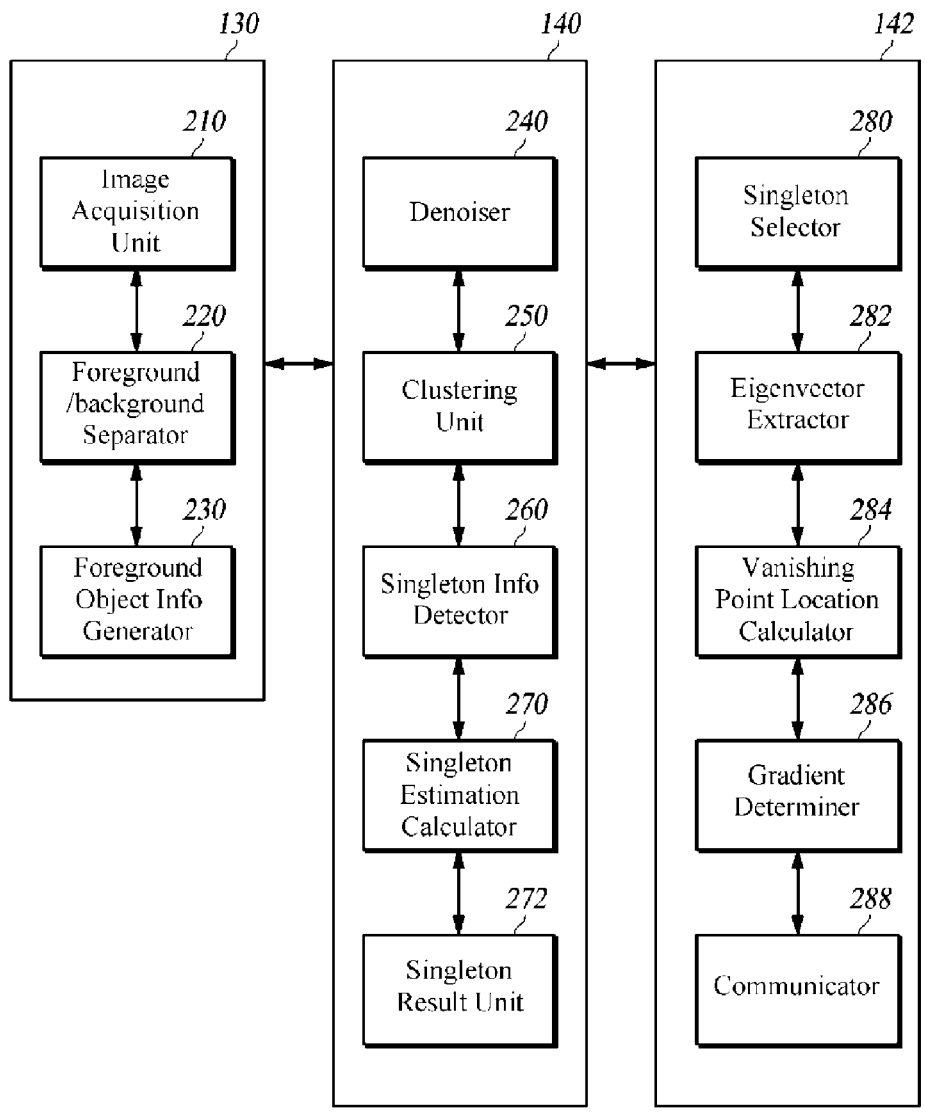
FIG. 2 is a schematic block diagram of an image monitoring apparatus for estimating the gradient of a singleton, according to at least one embodiment.

FIG. 2 is a schematic block diagram of an image monitoring apparatus for estimating the gradient of a singleton, according to at least one embodiment.

According to this embodiment of the present disclosure, the image monitoring apparatus 120 includes an image acquisition unit 210, a foreground/background separator 220, a foreground object information generator 230, a denoiser 240, an aggregation unit 250, a singleton information detector 260, a singleton estimation calculator 270, a singleton result unit 272, a singleton selector 280, an eigenvector extractor 282, a vanishing point location calculator 284, a gradient determiner 286 and a communicator 288. Other components of the image monitoring apparatus 120, such as each of the image acquisition unit 210, the foreground/background separator 220, the foreground object information generator 230, the denoiser 240, the aggregation unit 250, the singleton information detector 260, the singleton estimation calculator 270, the singleton result unit 272, the singleton selector 280, the eigenvector extractor 282, the vanishing point location calculator 284, the gradient determiner 286 and the communicator 288 is implemented by, or includes, one or more processors and/or application-specific integrated circuits (ASICs). The image monitoring apparatus 120 comprises input units such as one or more buttons, a touch screen, a mic and so on, and output units such as a display, an indicator and so on.

The image acquisition unit 210 acquires an image captured by the image capturer 110, which is connected to the image monitoring apparatus 120. Herein, the captured image is constituted by one frame or a plurality of frames. While the image acquisition unit 210 is illustrated as acquiring images captured by the image capturer 110 by directly receiving the images, embodiments of the present disclosure are not limited thereto. The image acquisition unit 210 is also used to acquire an image pre-captured and stored by the image capturer 110 to estimate the size of an object in the image.

The foreground/background separator 220 separates foreground pixels corresponding to moving objects from the pixels in the captured image by removing background pixels corresponding to a motionless background. More specifically, the foreground/background separator 220 generates a background model by designating pixels which have not changed from the previously captured image as background pixels, and compares a captured image acquired by the image acquisition unit 210 with the background model to determine and separate pixels which do not correspond to the background model as foreground pixels. The foreground/background separator 220 generates a foreground image showing only the moving objects by using multiple separated foreground pixels. Herein, the foreground/background separator 220 separates the foreground image corresponding to the moving objects by setting a region corresponding to the background pixels to 0 and the foreground pixels for the moving objects to 1 among the pixels in the captured image.

The foreground/background separator 220 also separates the foreground pixels by using a Gaussian mixture model (GMM). The foreground/background separator 220 designates pixels having a plurality of Gaussian modes with weights greater than a predetermined reference value as background pixels, and separates the foreground pixels corresponding to the moving objects by removing the designated background pixels. For example, when there are multiple persons moving across a captured image, the foreground/background separator 220 measures weights of the Gaussian modes, designate background pixels for the static background having high weights, and separate foreground pixels corresponding to the multiple persons by removing the designated background pixels from the pixels of the captured image. Thereby, the foreground/background separator 220 generates a foreground image for the multiple moving persons.

The foreground object information generator 230 generates foreground object information by measuring the number of pixels and the coordinate values of the foreground objects in the foreground image separated by the foreground/background separator 220. Herein, the foreground object information generator 230 measures the number of pixels for each foreground object in the foreground image, and use the measured number of pixels as the area of the corresponding foreground object.

The foreground object information generator 230 measures the center point of the minimum bounding box of the foreground object for the coordinate value of the foreground object, but embodiments of the present disclosure are not limited thereto. The coordinate value of a predetermined point present at the edge of the minimum bounding box of the foreground object is measured for the coordinate value of the foreground object. Herein, the coordinate value of the foreground object is a y coordinate necessary for identifying perspective of the foreground object. The bounding box has a rectangular shape, but embodiments of the present disclosure are not limited thereto. The bounding box has other shapes such as an ellipse, a circle, a triangle, and the like.

Meanwhile, the foreground object information generator 230 determines whether image monitoring can be performed by using the foreground object information. When the data amount is less than a predetermined reference amount, the foreground object information generator 230 repeatedly measures the number of pixels and coordinate values of the foreground objects based on a predetermined time and data amount to generate foreground object information. For example, when the foreground object information includes data for 500 foreground objects or more, and the maximum information collection time is set to 2 seconds, then 500 or more pieces of foreground object information are generated, or the foreground object information generated after the 2 seconds of information collection time are used for image monitoring.

The denoiser 240 removes a noise in the foreground object information whose size cannot be measured or need not be measured.

According to some embodiments of the present disclosure, the denoiser 240 removes the noise through denoising by using an area histogram of the foreground objects or through denoising by using the coordinate values included in the foreground object information.

The denoiser 240 determines a foreground object as a noise and removes the same when the area of the foreground object, represented by the number of pixels of the foreground object, is less than a predetermined amount. For example, the denoiser 240 compiles histogram based statistics on the number of pixels of each foreground object included in the foreground object information. When the number of pixels of a foreground object is within a preset range or less than a predetermined reference value, the denoiser 240 determines the pixels as noise and remove the same from the foreground object information.

In another case, the denoiser 240 determines a foreground object as noise and remove the same based on the coordinate value of the foreground object when what is visible in the captured image is not the whole shape of the foreground object but a portion thereof with its upper, lower, left or right edge of the foreground object cropped out of the captured image.

The clustering unit 250 clusters the denoised foreground object information into two groups. More specifically, the clustering unit 250 clusters the denoised foreground object information into two groups by using the value of at least one of image features including an aspect ratio for the foreground object information, a fill ratio of the foreground object information and a second moment in order to determine information on a singleton constructed by a single object in the denoised foreground object information. Herein, the aspect ratio for the foreground object information refers to the ratio of the width of the minimum bounding box to the height of the minimum bounding box, and the fill ratio of the foreground object information refers to a value calculated by dividing the total number of pixels of a denoised foreground object by the number of pixels included in the corresponding minimum bounding. The second moment refers to a value calculated using the coordinate values of the pixels included in the foreground object. The second moment M is calculated by using Equation 1 below.

$$M = \begin{vmatrix} \mu_{00} & \mu_{01} \\ \mu_{10} & \mu_{11} \end{vmatrix}$$

$$= \frac{1}{N} \begin{vmatrix} \sum (x-x_0)^2(x-x_0)^2 f(x,y) & \sum (x-x_0)^2(y-y_0)^2 f(x,y) \\ \sum (x-x_0)^2(y-y_0)^2 f(x,y) & \sum (y-y_0)^2(y-y_0)^2 f(x,y) \end{vmatrix}$$

Equation 1

Herein, M denotes the second moment, p denotes an average of coordinate values of the foreground pixels included in a foreground object, N denotes the number of pixels of the foreground object, (x, y) denotes the coordinates of pixels in the foreground image, and (x0, y0) denotes the coordinates of the centroid of the foreground object, and f(x, y) is 1 (foreground) or 0 (background).

Herein, the second moment M is calculated by using the determinant for the average of the coordinate values of the foreground pixels included in the foreground object.

According to some embodiments of the present disclosure, the clustering unit 250 divides at least one of the aspect ratio and the fill ratio of the foreground object and the second moment into two groups by using the k-means clustering method. However, embodiments of the present disclosure are not limited thereto. Any clustering method is used, including a hierarchical clustering method, a non-hierarchical clustering method and a model-based method which can divide the foreground object into a predetermined number of groups by using predetermined features. Herein, the k-means clustering method refers to a method for setting an initial value for clustering the foreground object into two groups and creating similar groups by using at least one of the aspect ratio for the foreground pixels, the fill ratio of the foreground object and the second moment. Since the k-means clustering method is widely used, a more detailed description thereof will be omitted.

The singleton information detector 260 determines a singleton group including singletons between two groups generated through clustering, and detects singleton information. More specifically, the singleton information detector 260 estimates a predetermined linear function representing a relationship between the y coordinates of the foreground pixels clustered by the clustering unit 250 and the number of pixels of the foreground objects by using a least-squares method, and calculates an average error in the number of pixels in each group by using the number of pixels of the foreground objects estimated with the predetermined linear function and the actual number of pixels of the foreground objects to determine a group having the smaller error as a group including singletons. Thereby, the singleton information detector 260 detects the information on the singletons in the determined group.

The predetermined linear function representing a relationship between the y coordinates of the foreground pixels clustered by the singleton information detector 260 and the number of pixels of a corresponding foreground object is defined by Equation 2 below.

$$a = p_1 + p_2 \times y$$

Equation 2 where a denotes an estimated number of pixels of the foreground object, p1 denotes the a-intercept of the predetermined linear function, p2 denotes the slope of the predetermined linear function, and y denotes y coordinates of foreground pixels.

The singleton information detector 260 estimates the number of pixels of a foreground object by substituting y coordinates of foreground pixels into Equation 2. Herein, the singleton information detector 260 calculates an error in the number of pixels of each foreground object using the calculated number of pixels of each foreground object and the actual number of pixels of each foreground object, determines one group having the smaller error in the number of pixels than the other group as a group including singletons by comparing average errors in the number of pixels in the two groups, and detects singleton information on the singletons included in the determined group. Herein, the singleton information includes the coordinates of pixels of the singleton and the number of pixels of the singleton.

The average error value $e_c$ of errors in the number of pixels of the foreground objects included in each group is calculated by using Equation 3.

$$e_c = \frac{1}{N_c}\sum_{i=1}^{N_c}\{a_i - (p_1 + p_2 \times y_i)\}^2, \quad \text{Equation 3}$$

where $e_c$ denotes an average error in a group, $N_c$ denotes the number of foreground objects in Group c, $a_i$ denotes the actual number of pixels of the foreground objects, and $p_1+p_2 \times y_i$ denotes the number of pixels of the foreground objects estimated in Equation 1.

The singleton estimation calculator 270 estimates a predetermined nonlinear function for the singleton information detected by the singleton information detector 260 by using nonlinear optimization, and calculates an estimate of the size of each singleton based on the predetermined nonlinear function. More specifically, the singleton estimation calculator 270 estimates a predetermined nonlinear function representing a relationship between y coordinates of the pixels of a singleton included in the singleton information and the number of pixels of the singleton through nonlinear optimization, and it calculates the area of the singleton by using the predetermined nonlinear function. Herein, the estimates of the area, the width and the height of the singleton corresponding to the size of the singleton are calculated based on the predetermined nonlinear function for calculating the area of the singleton. That is, the estimates of the singleton are calculated with respect to the area of the singleton, the width of the singleton and the height of the singleton corresponding to the size of the singleton, respectively.

Meanwhile, the singleton estimation calculator 270 uses nonlinear optimization since the relationship between the y coordinates of pixels of a singleton and the number of pixels of the singleton is nonlinear depending on performance of the lens, the viewing angle and the installation angle of the image capturer 110. However, embodiments of the present disclosure are not limited thereto. The singleton estimation calculator 270 uses linear optimization.

The predetermined nonlinear function for a relationship between the y coordinates of the pixels of a singleton included in the singleton information and the number of pixels of the singleton, which is estimated by the singleton estimation calculator 270, is given as Equation 4 below.

$$a = p_{a1} + p_{a2} \times y^{Pa3} \quad \text{Equation 4}$$

where a denotes an estimated area of a singleton, $p_{a1}$ denotes the a-intercept of the predetermined nonlinear function, $p_{a2}$ denotes the coefficient of the predetermined nonlinear function, $p_{a3}$ denotes the curvature of the predetermined nonlinear function, and y denotes y coordinates of the singleton.

In Equation 4, parameters $p_{a1}$, $p_{a2}$ and $p_{a3}$ are set to values that will minimize error $e_a$ calculated in Equation 5 below by using nonlinear optimization.

$$e_a = \frac{1}{N_c}\sum_{i=1}^{N_c}\{a_i - (p_{a1} + p_{a2} \times y^{Pa3})\}^2, \quad \text{Equation 5}$$

where $e_a$ denotes an error in the number of pixels in the singleton group, $N_c$ denotes the number of foreground objects in the singleton group, $a_i$ denotes an actual number of pixels of each foreground object in the singleton group, and $p_{a1}+p_{a2} \times y^{Pa3}$ denotes the number of pixels of the foreground objects in the singleton group estimated in Equation 4.

A function with which the singleton estimation calculator 270 calculates the width of the singleton in relation to the size of the singleton based on Equation 4 is defined by Equation 6 given below. To calculate the width of the singleton, the singleton group as used to estimate the area of the singleton in Equation 4 is applied. However, embodiments of the present disclosure are not limited thereto. Some embodiments only uses the singletons having areas which differ from the estimated singleton area by a predetermined threshold or smaller. For example, arbitrary singleton i having actual area measurement $a_i$ with up to 10% difference from estimated area 'a' in Equation 4 is chosen to undergo the width estimation and the height estimation.

$$w = p_{w1} + p_{w2} \times y^{Pw3}, \quad \text{Equation 6}$$

where w denotes the width of a singleton corresponding to the size of the singleton, $p_{w1}$ denotes the w-intercept of the function for calculating the width, $p_{w2}$ denotes the coefficient of the function for calculating the width, $p_{w3}$ denotes the curvature of the function for calculating the width, and y denotes y coordinates of the singleton.

In Equation 6, parameters $p_{w1}$, $p_{w2}$ and $p_{w3}$ are set to values that will minimize error $e_w$ calculated in Equation 7 below through nonlinear optimization.

$$e_w = \frac{1}{N_a}\sum_{i=1}^{N_a}\{w_i - (p_{w1} + p_{w2} \times y^{Pw3})\}^2, \quad \text{Equation 7}$$

where $e_w$ denotes a width error in the singleton group, $N_a$ denotes the number of foreground objects in the singleton group, having the error in the number of pixels is less than or equal to a threshold, $w_i$ denotes the actual widths of the foreground objects in the singleton group, and $p_{w1}+p_{w2} \times y^{Pw3}$ denotes the widths of the foreground objects in the singleton group estimated in Equation 6, having the error in the number of pixels is less than or equal to the threshold.

A function with which the singleton estimation calculator 270 calculates the height of each singleton corresponding to the size of the singleton based on Equation 4 is defined by Equation 8 below.

$$h = p_{h1} + p_{h2} \times y^{Ph3}, \quad \text{Equation 8}$$

where h denotes the height of a singleton corresponding to the size of the singleton, $p_{h1}$ denotes the h-intercept of the function for calculating the height, $p_{h2}$ denotes a coefficient of the function for calculating the height, $p_{h3}$ denotes the curvature of the function for calculating the height, and y denotes y coordinates of the singleton.

In Equation 8, parameters $p_{h1}$, $p_{h2}$ and $p_{h3}$ are set to values that will minimize an error $e_h$ calculated in Equation 9 below through nonlinear optimization.

$$e_h = \frac{1}{N_a}\sum_{i=1}^{N_a}\{h_i - (p_{h1} + p_{h2}\times y^{p_{h3}})\}^2, \quad \text{Equation 9}$$

where $e_h$ denotes a height error in the singleton group, $N_a$ denotes the number of foreground objects in the singleton group, having the error in the number of pixels is less than or equal to a threshold, $h_i$ denotes the actual heights of the foreground objects in the singleton group, and $p_{h1}+p_{h2}\times y^{p_{h3}}$ denotes the heights of the foreground objects in the singleton group estimated in Equation 8, having the error in the number of pixels is less than or equal to the threshold among the foreground objects.

The singleton result unit 272 generates singleton resulting information on the singleton with the area, the width and the height calculated by the singleton estimation calculator 270.

The singleton selector 280 generates a single foreground image of singletons based on the resulting singleton information generated by the singleton result unit 272, and selects at least one foreground singleton in the foreground image. Herein, a foreground singleton is selected by an input from the administrator. However, embodiments of the present disclosure are not limited thereto. A singleton is selected as the foreground singleton when the size of the singleton is within a preset reference range.

The eigenvector extractor 282 extracts an eigenvector of a foreground singleton selected by the singleton selector 280. The eigenvector includes a first eigenvector which is aligned with the principal direction of the pixels of the foreground singleton, and a second eigenvector perpendicular to the first eigenvector. Herein, the principal direction refers to a direction parallel to the height of the singleton.

The eigenvector extractor 282 calculates the eigenvectors by using a covariance matrix. Herein, the covariance matrix is a matrix representing a correlation between two random variables. According to some embodiments of the present disclosure, the covariance matrix C is calculated using Equation 10 below.

$$C = \frac{1}{M}\sum_{i=1}^{M}(X_i - m)(X_i - m)^T, \quad \text{Equation 10}$$

where C denotes a covariance matrix, M denotes the number of pixels in the foreground singleton, $X_i$ denotes a two-dimensional vector of the coordinates of the i-th pixel in the foreground singleton, and 'm' denotes a two-dimensional vector of the coordinates of the centroid of the pixels in the foreground singleton.

Once the covariance matrix C is calculated in Equation 10, 'x' satisfying $C \cdot x = \lambda \cdot x$ (where $\lambda$ is the eigenvalue of C) is calculated and extracted as the eigenvector of the foreground singleton. Herein, the eigenvector is characteristically aligned with the principal direction of the pixels of the foreground singleton and constructed by two perpendicular vectors which are two-dimensional.

The vanishing point location calculator 284 calculates the location of one vanishing point at which the eigenvectors of the foreground singletons in a single foreground image intersect.

According to some embodiments of the present disclosure, the vanishing point location calculator 284 calculates the angle between a reference vector produced by connecting any point in a captured image to the centroid of the foreground singleton and the eigenvector extracted by the eigenvector extractor 282 and computes, as the location of the vanishing point, one point that minimizes the angle between the two vectors. More specifically, when a point in the captured image is defined as $v_z$, and the centroid of the i-th foreground singleton is defined as $m_i$, a reference vector produced by connecting the point in the captured image to the centroid of the foreground singleton is represented by $v_z - m_i$. The vanishing point location calculator 284 calculates the angle between the reference vector $v_z - m_i$ and the eigenvector $e_i$ extracted by the eigenvector extractor 282 and determines a point $v_z$ minimizing the angle between the two vectors $v_z - m_i$ and $e_i$ as the vanishing point.

The vanishing point location calculator 284 calculates the angular difference value $e^2$ minimizing the angle between the reference vector produced by connecting a point in the captured image to the centroid of the foreground singleton and the eigenvector of the foreground singleton according to Equation 11 below.

$$\varepsilon^2 = \sum_{i=1}^{N}(1-\cos\theta)^2 \quad \text{Equation 11}$$

$$= \sum_{i=1}^{N}\left(1 - \frac{(v_z - m_i)\cdot e_i}{\|v_z - m_i\|\cdot\|e_i\|}\right)^2$$

$$= \sum_{i}\frac{\{(v_x - m_x(i))e_x(i) + (v_y - m_y(i))e_y(i)\}^2}{\{(v_x - m_x(i))^2 + (v_y - m_y(i))^2\}(e_x^2(i) + e_y^2(i))}$$

where $\epsilon^2$ denotes an error in the angle between the reference vector and the eigenvector, $\theta$ denotes the angle between the reference vector and the eigenvector, $v_z$ denotes a point in the captured image, $v_z - m_i$ denotes the reference vector, and $e_i$ denotes the eigenvector.

Equation 11 that nearly zeroes the angle between the reference vector and the eigenvector is found by using a nonlinear optimization method. According to some embodiments of the present disclosure, the vanishing point location calculator 284 performs nonlinear optimization using the Nelder-Mead simplex method. However, embodiments of the present disclosure are not limited thereto.

The gradient determiner 286 determines the gradient information on each foreground singleton, namely the pose of each foreground singleton by using the vanishing point calculated by the vanishing point location calculator 284 and corrects the size of the identified objects.

According to some embodiments of the present disclosure, the gradient determiner 286 determines the gradient of each foreground singleton, adjusts the inclination of the minimum bounding box of a corresponding object, and corrects the size of the minimum bounding box such that the corrected size of the minimum bounding box is similar to the actual size of the object.

The communicator 288 transmits, to the monitoring unit 150, the minimum bounding box of the foreground singleton whose inclination and size are corrected by the gradient determiner 286, such that the minimum bounding box is displayed on the monitoring unit 150 with the adjusted inclination and corrected size of the minimum bounding box indicated.

Figure 3:
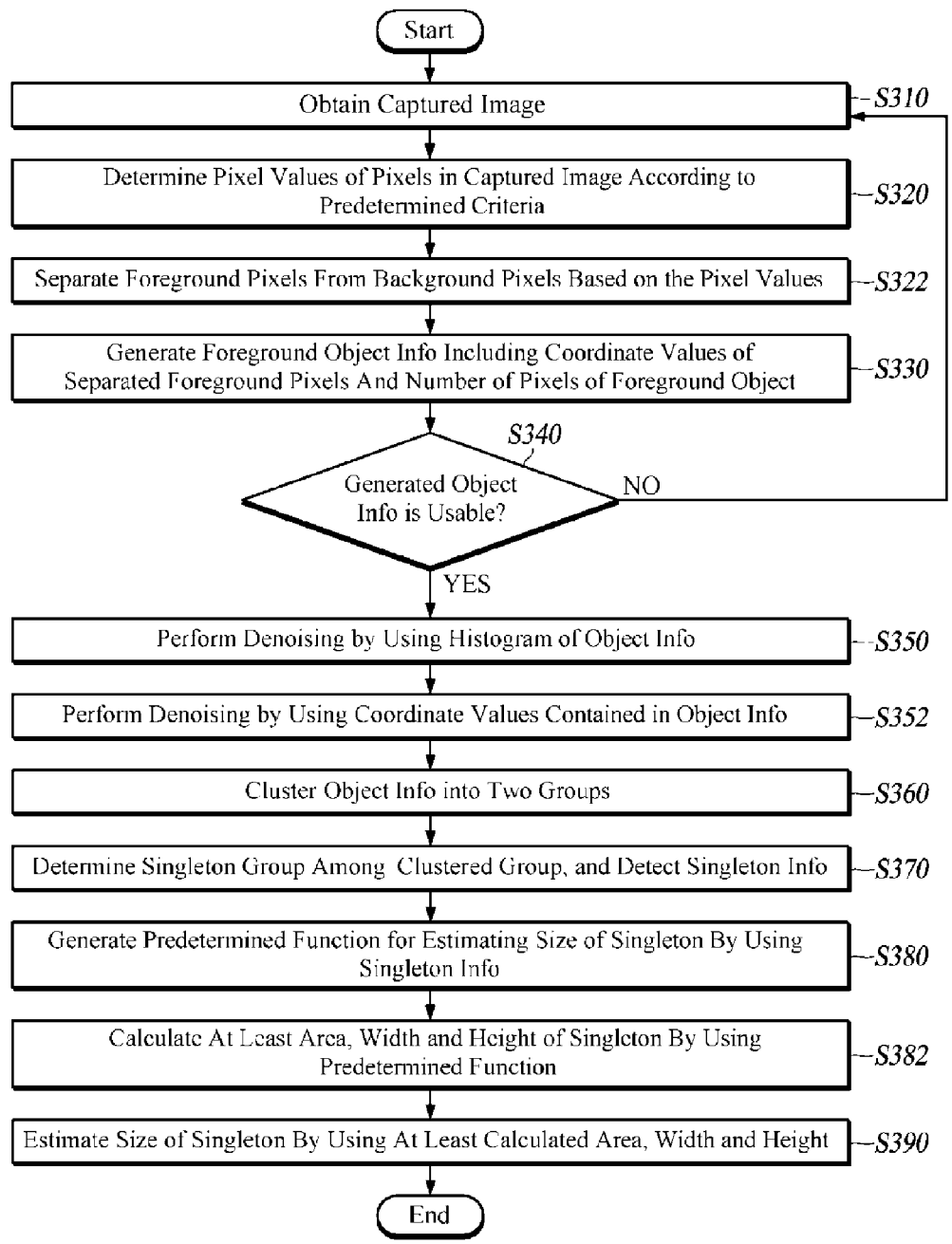
FIG. 3 is a flowchart of an operation, performed by an image monitoring apparatus, for detecting a singleton, according to at least one embodiment.

FIG. 3 is a flowchart of an operation, performed by an image monitoring apparatus, for detecting a singleton, according to at least one embodiment.

The image monitoring apparatus 120 acquires an image captured by the image capturer 110 or an image previously captured and stored (S310).

The image monitoring apparatus 120 determines pixel values of pixels in a captured image according to predetermined criteria (S320).

The image monitoring apparatus 120 separates background pixels for a background which does not exhibit a designated movement and foreground pixels for a moving object, based on the pixel values determined in step S320 (S322). Herein, the image monitoring apparatus 120 generates a background model by designating pixels which have not changed as background pixels based on a previously captured image, and compares an acquired captured image with the background model to determine and separate pixels which do not correspond to the background model as foreground pixels.

The image monitoring apparatus 120 generates foreground object information by measuring coordinate values of the foreground pixels separated in step S322 and the number of pixels of the foreground objects (S330). Herein, the image monitoring apparatus 120 repeatedly measures the number of pixels of the foreground objects and the coordinate values of the foreground pixels based on a preset time and data amount.

The image monitoring apparatus 120 determines whether the object information is usable for object sensing based on a predetermined time and an information amount (S340).

When the object information corresponds to preset reference information as a result of determination in step S340, the image monitoring apparatus 120 denoises the foreground objects using a histogram for the object information (S350), and then denoises the foreground object using the coordinate values included in the object information (S352).

The image monitoring apparatus 120 extracts features of the foreground objects using the object information and clusters the object information into two groups (S360).

The image monitoring apparatus 120 determines a singleton group between two groups created in step S360, and detects singleton information on singletons (S370). Herein, the image monitoring apparatus 120 estimates a predetermined linear function representing a relationship between the y coordinates of the foreground pixels clustered by the clustering unit 250 and the number of pixels of the foreground objects using the least-squares method, compares the number of pixels of the foreground objects estimated using the predetermined linear function with the actual number of pixels of the foreground objects to determine a group having the smaller error of the two groups as a group including the singletons, and detects singleton information on the singletons.

The image monitoring apparatus 120 generates a predetermined function for estimation of the size of the singletons using the singleton information (S380). The image monitoring apparatus 120 generates a predetermined nonlinear function through nonlinear optimization of the singleton information.

The image monitoring apparatus 120 calculates the area, width, and height of a singleton with the singleton information (S382). Herein, the image monitoring apparatus 120 calculates the area, width and height of the singleton corresponding to the size of the singleton using the predetermined nonlinear function.

The image monitoring apparatus 120 estimates the size of the singleton by using the area, width and height of the singleton calculated in step S382 (S390). Herein, the singletons are highlighted and displayed in the shape of various figures such as a quadrangle, an oval and a triangle corresponding to the estimated sizes of the singletons using the monitoring unit 150.

Although it is described that Steps S310 to S390 are sequentially performed in FIG. 3, merely to illustrate the idea of the present disclosure in some embodiments, one of ordinary skill would understand that these steps can be performed in a modified sequence or two or more of Steps S310 to S390 can be performed in parallel without departing from the essential characteristics of the disclosure. Therefore, the steps in FIG. 3 are not limited to the time sequential manner.

Figure 4:
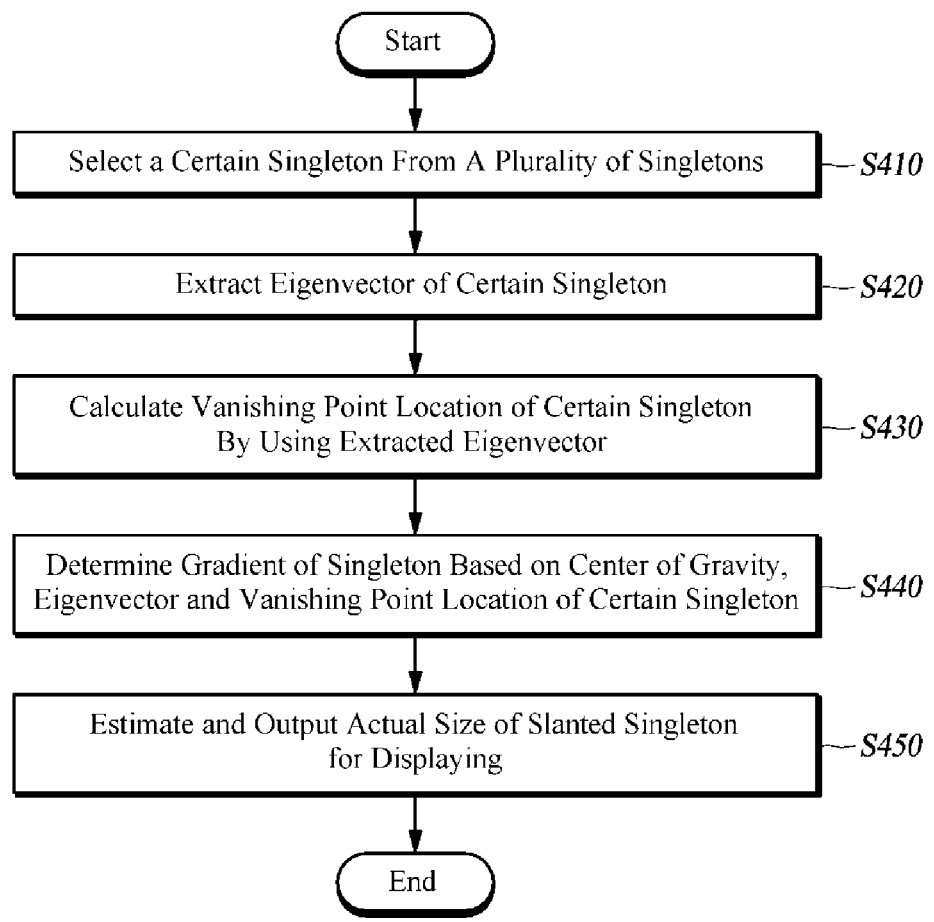
FIG. 4 is a flowchart of a method for monitoring video images by estimating the gradient of a singleton, according to at least one embodiment.

FIG. 4 is a flowchart of a method for monitoring video images by estimating the gradient of a singleton, according to at least one embodiment.

The image monitoring apparatus 120 selects a predetermined singleton as a foreground singleton from multiple singletons (S410). Herein, the image monitoring apparatus 120 compares the size of each singleton estimated using at least one measured value of the area, the width and the height of each of the singletons with a preset reference value, and when the estimated size of a singleton is greater or less than the preset reference value, the image monitoring apparatus 120 selects the singleton as a foreground singleton.

The image monitoring apparatus 120 extracts the eigenvector of the foreground singleton (S420). The eigenvector includes a first eigenvector, which is aligned with the principal direction of the pixels of the foreground singleton, and a second eigenvector perpendicular to the first eigenvector. Herein, the principal direction refers to a direction parallel to the height of the singleton.

The image monitoring apparatus 120 calculates the location of the vanishing point using the eigenvector extracted in step S420 (S430). Herein, the image monitoring apparatus 120 calculates the angle between a reference vector produced by connecting any point in a captured image to the centroid of the foreground singleton and the eigenvector extracted in step S420, and computes, as the location of the vanishing point, one point that minimizes the angle between the two vectors.

The image monitoring apparatus 120 determines the gradient of the foreground singleton based on the centroid and eigenvector of the foreground singleton and the vanishing point (S440).

The image monitoring apparatus 120 corrects the inclination and size of the minimum bounding box of the foreground singleton based on the gradient determined in step S440 and transmits the same to the monitoring unit 150 such that the foreground singleton is displayed (S450).

Although it is described that Steps S410 to S450 are sequentially performed in FIG. 4, merely to illustrate the idea of the present disclosure in some embodiments, one of ordinary skill would understand that these steps can be performed in a modified sequence or two or more of Steps S410 to S450 can be performed in parallel without departing from the essential characteristics of the disclosure. Therefore, the steps in FIG. 4 are not limited to the time sequential manner.

Figure 5:
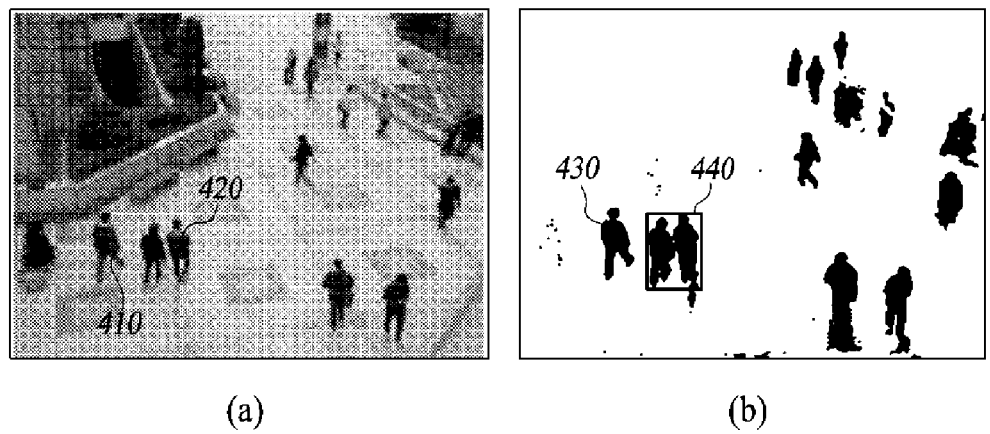
FIG. 5 is a diagram of an operation, performed by an image monitoring apparatus, for dividing a captured image into separate foreground pixels and background pixels, according to at least one embodiment.

FIG. 5 is a diagram of an operation, performed by an image monitoring apparatus, for dividing a captured image into separate foreground pixels and background pixels, according to at least one embodiment.

FIG. 5(a) shows a captured image which the image monitoring apparatus 120 receives from the image capturer 110, and FIG. 5(b) shows a foreground image generated using only the foreground pixels after the image monitoring apparatus 120 removes the background pixel from the pixels of the captured image.

For example, FIG. 5(a) shows an image of multiple pedestrians captured by a CCTV installed over a sidewalk in a city. Herein, a first object 510 represents a pedestrian walking alone, and a second object 520 represents two nearby pedestrians walking together. The first object 510 and the second object 520 are displayed in the separated foreground image of FIG. 5(b) as a first foreground object 530 and a second foreground object 540. Herein, the image monitoring apparatus 120 determines, by performing clustering, that the first foreground object 530 is a singleton, and measures the coordinate value and the number of pixels of the first foreground object 530. On the other hand, the image monitoring apparatus 120 determines, by performing clustering, that the second foreground object 540 is not a singleton, and excludes the second foreground object 540 from singletons.

Figure 6:
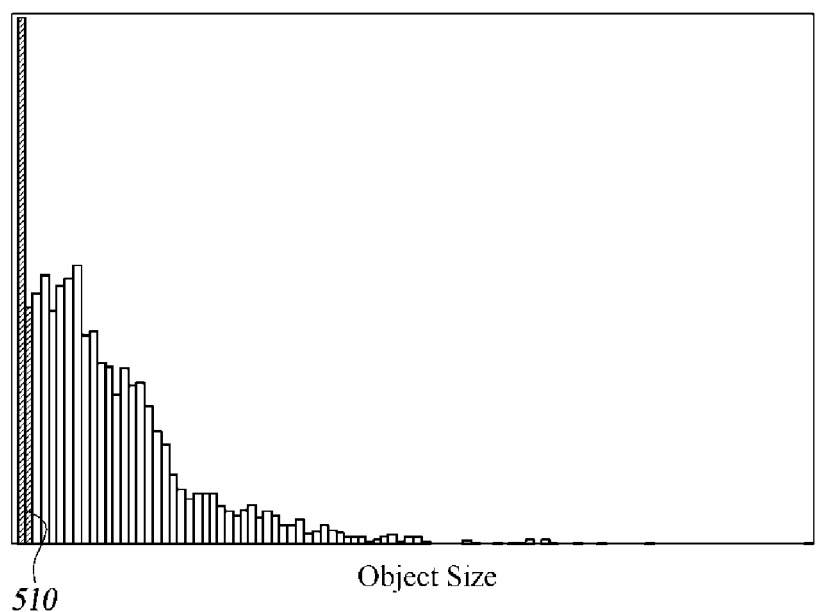
FIG. 6 is a diagram of a denoising operation performed by a denoiser included in an image monitoring apparatus, using a histogram of foreground pixels, according to at least one embodiment.

FIG. 6 is a diagram of a denoising operation, performed by a denoiser included in an image monitoring apparatus, using a histogram of foreground pixels, according to at least one embodiment.

The denoiser 240 according to this embodiment generates an area histogram with the foreground object information on the foreground objects, and when the area in the generated histogram data is within a preset range or less than a predetermined reference value 510 (e.g., the lowest 5% of the histogram data), the denoiser 240 determines the foreground object information 610 as noise and remove the same.

In the graph of FIG. 6, the x-axis represents object sizes (areas), and the y-axis represents occurrence frequencies. For example, the denoiser 240 removes small noises occurring in the image processing including image capture, conversion, separation, and calibration of a foreground image.

Figure 7:
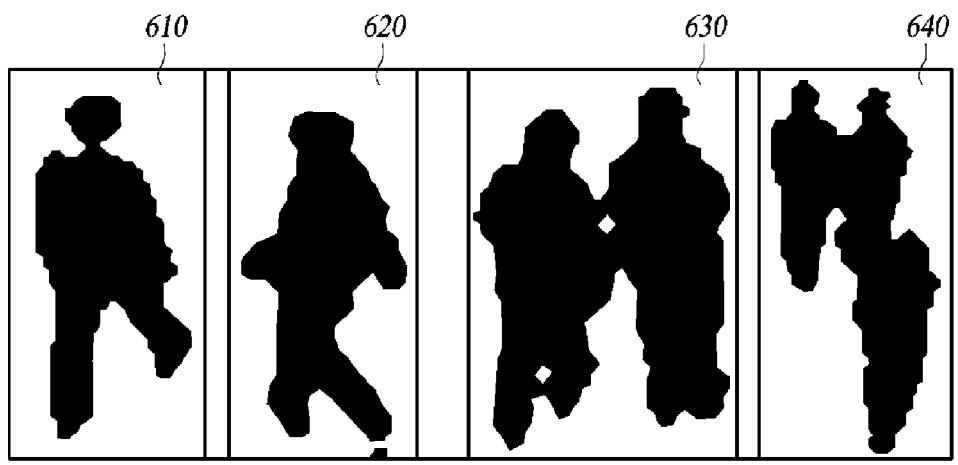
FIG. 7 is a diagram of an operation, performed by an image monitoring apparatus, for determining a singleton through performing a clustering, according to at least one embodiment.

FIG. 7 is a diagram of an operation, performed by an image monitoring apparatus, for determining a singleton through clustering, according to at least one embodiment.

As shown in FIG. 7, when there are a first foreground object 710, a second foreground object 720, a third foreground object 730 and a fourth foreground object 740 present in a foreground image, the image monitoring apparatus 120 divides the foreground objects into two groups using a preset clustering technique. Herein, one of the two groups refers to a singleton group, and the other refers to a group of foreground objects including one or more objects. For example, the first foreground object 710 and the second foreground object 720 are included in the singleton group, and the third foreground object 730 and the fourth foreground object 740 are included in a plurality-of-objects group. Herein, the image monitoring apparatus 120 calculates the areas of the singletons only with singleton information on the first foreground object 710 and the second foreground object 720 included in the singleton group and output the same through the monitoring unit 150.

Figure 8:
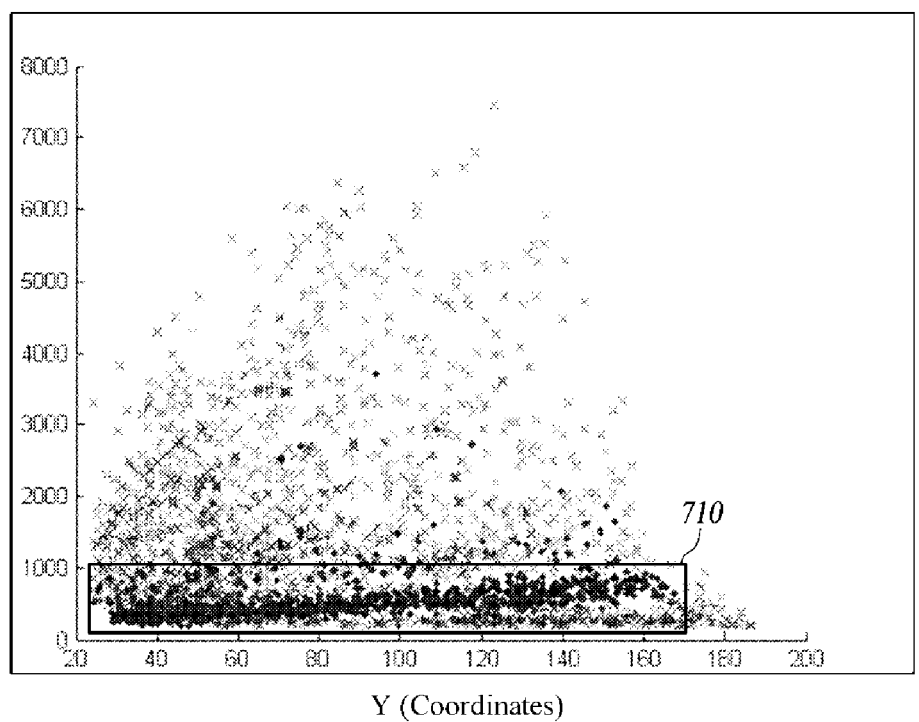
FIG. 8 is a graph of an outcome of clustering foreground pixels to be used by an image monitoring apparatus for detecting a singleton, according to at least one embodiment.

FIG. 8 is a graph of an outcome of clustering of foreground pixels for singleton detection performed by an image monitoring apparatus, according to at least one embodiment.

The graph of FIG. 8 shows an outcome of clustering of the foreground pixels included in a foreground image into two groups performed by the image monitoring apparatus 120 using the k-means clustering method. One of the two groups is indicated by "♦", and the other is indicated by "x".

As shown in FIG. 8, the image monitoring apparatus 120 estimates a predetermined linear function representing a relationship between the y coordinates of the clustered foreground pixels and the number of pixels of the foreground object using the least-squares method, and compare average errors in the number of pixels in the groups by using the number of pixels of a foreground object estimated using the predetermined linear function and the actual number of pixels of the foreground object, thereby determining a group having the smaller error as a group 810 including singletons.

Figure 9:
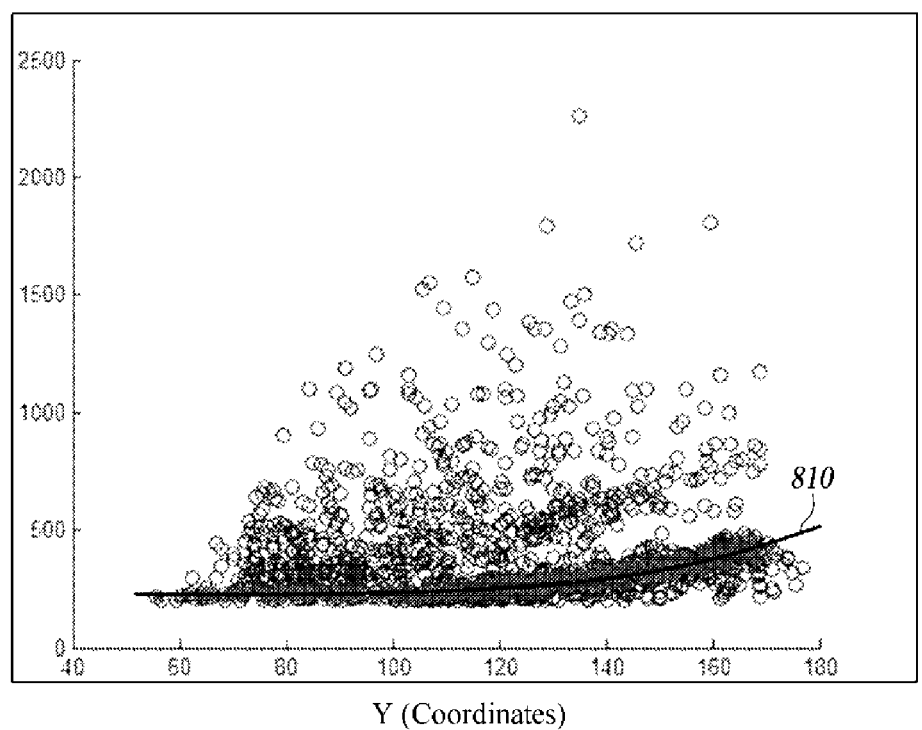
FIG. 9 is a graph of an operation, performed by an image monitoring apparatus, for calculating the area of a singleton, according to at least one embodiment.

FIG. 9 is a graph of an operation, performed by an image monitoring apparatus, for calculating the area of a singleton, according to at least one embodiment.

The graph shown in FIG. 9 represents an outcome of the estimation of a predetermined nonlinear function 910 performed by the image monitoring apparatus 120 with nonlinear optimization for singleton information. All information related to the singleton information is indicated by "∘", and information corresponding to an area of a singleton corresponding to the predetermined nonlinear function 910 is indicated by "⋅".

The image monitoring apparatus 120 calculates the width of the singleton and the height of the singleton in relation to the size of the singleton based on the predetermined nonlinear function 910.

Figure 10:
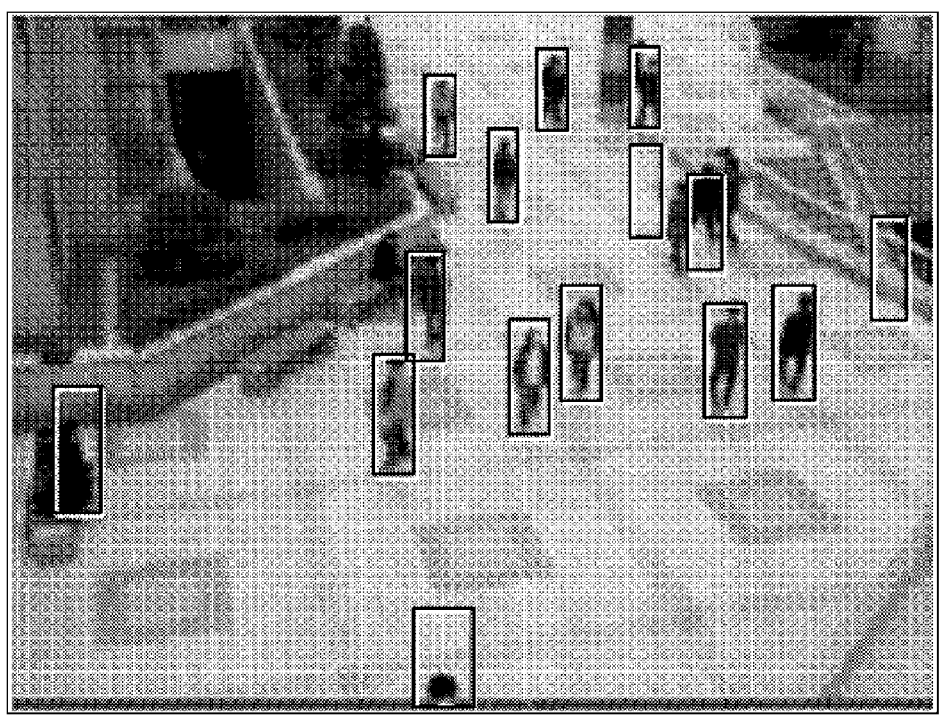
FIG. 10 is an exemplary image of singletons detected by estimating the sizes of the singletons with an image monitoring apparatus, according to at least one embodiment.

FIG. 10 is an exemplary image of singletons detected by estimating the sizes of the singletons with an image monitoring apparatus, according to at least one embodiment.

FIG. 10 shows a displayed image containing singletons indicated by using the area, width and height of each singleton calculated by the image monitoring apparatus 120. Herein, the singletons are highlighted and displayed in the shape of various figures such as a quadrangle, an ellipse and a triangle, using the widths and heights of the singletons as shown in FIG. 10.

Figure 11:
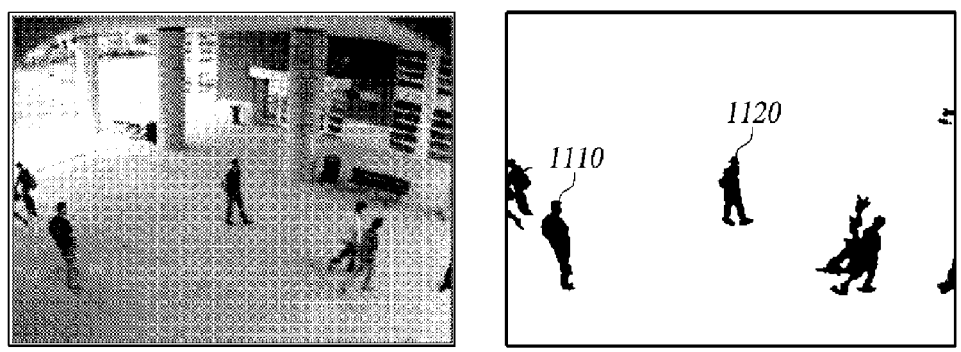
FIG. 11 is a diagram of a foreground image of foreground singletons in an image monitoring apparatus according to at least one embodiment.

FIG. 11 is a diagram of a foreground image of foreground singletons in an image monitoring apparatus according to at least one embodiment.

FIG. 11(a) shows a captured image which the image monitoring apparatus 120 acquires from the image capturer 110, and FIG. 11(b) shows a single foreground image of foreground singletons corresponding to the singletons extracted by the image monitoring apparatus 120.

For example, the foreground singletons shown in FIG. 11(b) are indicated by a first foreground singleton 1110 and a second foreground singleton 1120. Herein, the first foreground singleton 1110 and the second foreground singleton 1120 are foreground singletons selected from among the singletons whose area, width and height are estimated through clustering by the image monitoring apparatus 120.

Figure 12:
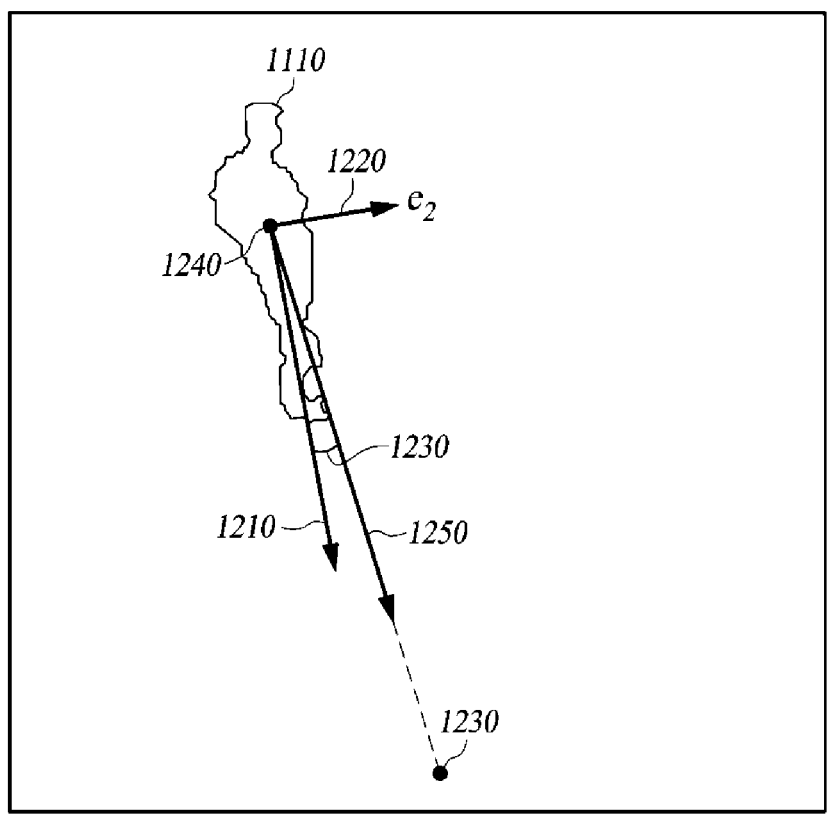
FIG. 12 is a diagram of an operation, performed by an image monitoring apparatus, for estimating the gradient of a certain foreground singleton, according to at least one embodiment.

FIG. 12 is a diagram of an operation, performed by an image monitoring apparatus, for estimating the gradient of a certain foreground singleton, according to at least one embodiment.

According to some embodiments, the first foreground singleton 1110 selected by the image monitoring apparatus 120 has a first eigenvector 1210 and a second eigenvector 1220 which are extracted using a covariance matrix. Herein, the first eigenvector 1210 is a vector indicating the principal direction which is parallel to the height of the first foreground singleton 1110, and the second eigenvector 1220 is a vector perpendicular to the first eigenvector 1210.

The image monitoring apparatus 120 calculates an angle 1230 between a reference vector 1250 produced by connecting any point 1230 in the image to the centroid 1240 of the first foreground singleton 1110 and the first eigenvector 1210 using a predetermined error function and determines the point 1230 as the vanishing point of the foreground singleton when the point 1230 minimizes the angle 1230.

Figure 13:
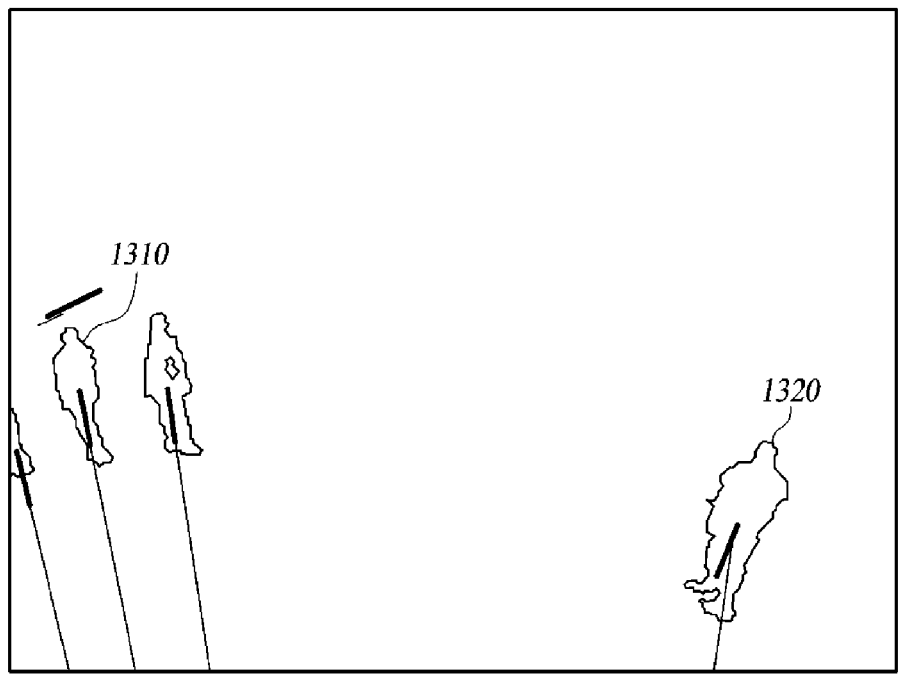
FIG. 13 is a diagram of an operation, performed by an image monitoring apparatus, for estimating the gradient of a certain foreground singleton by using the eigenvector of the singleton, according to at least one embodiment.

FIG. 13 is a diagram of an operation, performed by an image monitoring apparatus, for estimating the gradient of a certain foreground singleton by using the eigenvector of the singleton, according to at least one embodiment.

FIG. 13 shows eigenvectors of multiple foreground singletons 1310 and 1320 and reference vectors produced by connecting the vanishing point to the centroid of each foreground singleton, which the image monitoring apparatus 120 uses to estimate the gradient of each singleton.

Figure 14:
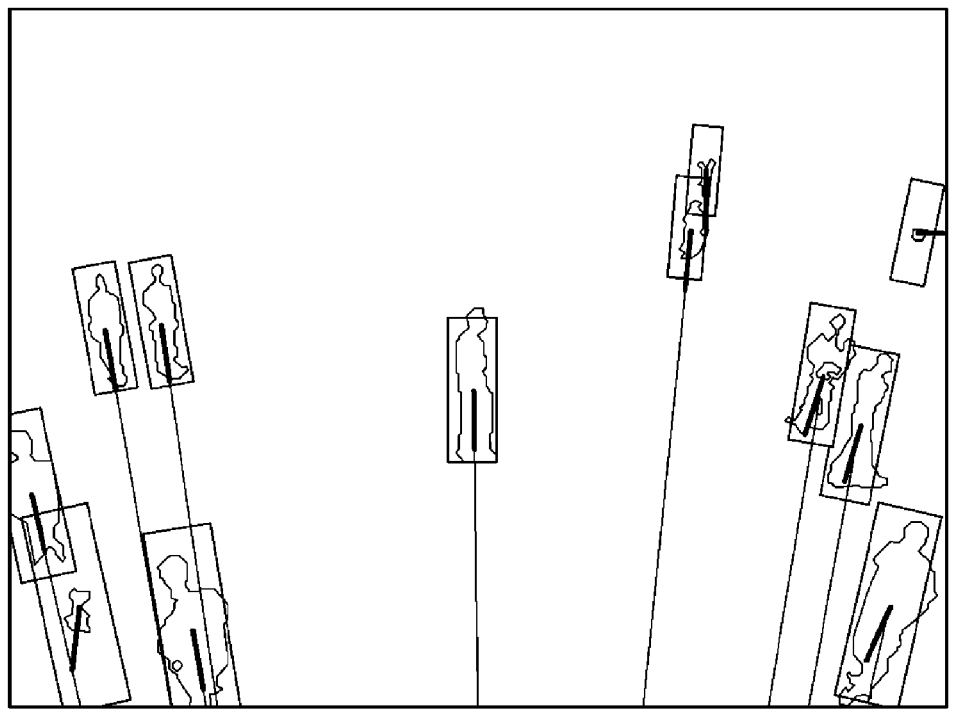
FIG. 14 is a diagram of a resulting image output with the sizes of foreground singletons corrected by estimating the gradient of each singleton with an image monitoring apparatus, according to at least one embodiment.

FIG. 14 is a diagram of a resulting image output with the sizes of foreground singletons corrected by estimating the gradient of each singleton with an image monitoring apparatus, according to at least one embodiment.

The image monitoring apparatus 120 determines the gradients of the foreground singletons, namely the poses of the foreground singletons by using the centroid and the eigenvector of each foreground singleton and the vanishing point, and corrects the size of each of the determined singletons.

As shown in FIG. 14, the image monitoring apparatus 120 adjusts the inclination of the minimum bounding boxes of the foreground singletons by determining the gradient of each singleton, and then display the minimum bounding boxes of the foreground singletons by correcting each minimum bounding box to have a width and a height similar to the actual size of the corresponding singleton.

According to various embodiments of the present disclosure as described above, even an object appearing in an image is inclined with respect to a vertical direction due to the camera viewing angle or a camera angle, the pose or gradient of the object is automatically identified. In addition, an image monitoring apparatus according to some embodiments enables more accurate description of the size and shape of an object, thereby improving the accuracy of image analysis.

Although exemplary embodiments of the present disclosure have been described for illustrative purposes, those skilled in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary embodiments of the present disclosure have been described for the sake of brevity and clarity. Accordingly, one of ordinary skill would understand that the scope of the claimed invention is not limited by the explicitly described above embodiments but by the claims and equivalents thereof.

What is claimed is:

1. An image monitoring apparatus, comprising:
    a singleton selector configured to select at least one singleton from among a plurality of objects in an acquired image;
    a single foreground image generator configured to generate a single foreground image of the singleton;
    an eigenvector extractor configured to extract an eigenvector of a foreground singleton contained in the single foreground image by using at least one selected from the group consisting of (i) a centroid of the foreground singleton, (ii) the number of pixels of the foreground singleton and (iii) coordinate values of the pixels;
    a vanishing point location calculator configured to
        generate a reference vector by connecting a predetermined point in the acquired image to the centroid of the foreground singleton, and
        determine the predetermined point as a vanishing point when the predetermined point minimizes an angle between the reference vector and the eigenvector; and
    a gradient determiner configured to
        determine a gradient of the foreground singleton using the vanishing point, and
        correct an inclination and a size of a bounding box of the foreground singleton.

2. The image monitoring apparatus of claim 1, wherein the eigenvector extractor calculates the eigenvector using a covariance matrix defined by the following equation:

$$C = \frac{1}{M} \sum_{i=1}^{M} (X_i - m)(X_i - m)^T,$$

wherein C denotes the covariance matrix, M denotes the number of pixels in the foreground singleton, $X_i$ denotes a two-dimensional vector corresponding to coordinates of an i-th pixel in the foreground singleton, and 'm' denotes a two-dimensional vector corresponding to coordinates of the centroid of the pixels in the foreground singleton.

3. The image monitoring apparatus of claim 2, wherein the eigenvector comprises at least two vectors extracted by applying the two-dimensional vectors to the covariance matrix.

4. The image monitoring apparatus of claim 3, wherein the eigenvector comprises
    a first eigenvector parallel to a height of the foreground singleton, and
    a second eigenvector perpendicular to the first eigenvector.

5. The image monitoring apparatus of claim 1, wherein the vanishing point location calculator is configured to
    apply the angle between the reference vector and the eigenvector to an error function, and
    determine the predetermined point as the vanishing point when the angle minimizes an error from the error function.

6. The image monitoring apparatus of claim 5, wherein the error function used by the vanishing point location calculator to calculate the error of the angle is defined by the following equation:

$$\varepsilon^2 = \sum_{i=1}^{N} (1 - \cos\theta)^2$$

$$= \sum_{i=1}^{N} \left(1 - \frac{(v_z - m_i) \cdot e_i}{\|v_z - m_i\| \cdot \|e_i\|}\right)^2$$

$$= \sum_i \frac{\{(v_x - m_x(i))e_x(i) + (v_y - m_y(i))e_y(i)\}^2}{\{(v_x - m_x(i))^2 + (v_y - m_y(i))^2\}(e_x^2(i) + e_y^2(i))},$$

wherein $\varepsilon^2$ denotes the error of the angle between the reference vector and the eigenvector, $\theta$ denotes the angle between the reference vector and the eigenvector, $v_z$ denotes a point in the acquired image, $v_z - m_i$ denotes the reference vector, and $e_i$ denotes the eigenvector.

7. The image monitoring apparatus of claim 5, wherein the vanishing point location calculator is configured to calculate a location of the vanishing point by repeatedly setting all or a portion of pixels in the acquired image as the predetermined point.

8. The image monitoring apparatus of claim 1, wherein the gradient determiner corrects the inclination of the minimum bounding box by using the gradient of the foreground singleton,
    wherein the gradient determiner corrects a size of the foreground singleton by adjusting a width and height of the minimum bounding box of the foreground singleton based on an pre-stored estimate of at least one of an area, width and height of the singleton.

9. The image monitoring apparatus of claim 1, wherein the single foreground image generator is configured to
generate a background model by designating pixels unchanged between a plurality of images, as background pixels,
compare the image acquired by the singleton selector with the background model,
determine pixels other than the background pixels corresponding to the background model as a foreground pixel, and
generate the single foreground image using the foreground pixels.

10. The image monitoring apparatus of claim 1, wherein the singleton selector is configured to
compare an estimated size of the singleton estimated by using at least one value of the area, the width and the height measured with respect to the singleton with a preset reference value, and
when the estimated size corresponds to a preset range of reference values, select the singleton as a foreground singleton.

11. A method performed by an apparatus for measuring a gradient of a singleton in an image by an image monitoring apparatus, the method comprising:
selecting at least one singleton from among a plurality of objects in an acquired image;
generating a single foreground image of the at least one singleton;
extracting an eigenvector of a foreground singleton contained in the single foreground image by using at least one selected from the group consisting of (i) a centroid of the foreground singleton, (ii) the number of pixels of the foreground singleton and (iii) coordinate values of the pixels;
generating a reference vector by connecting a predetermined point in the acquired image to the centroid of the foreground singleton;
determining the predetermined point as a vanishing point when the predetermined point minimizes an angle between the reference vector and the eigenvector;
determining a gradient of the foreground singleton using the vanishing point; and
correcting an inclination and a size of a bounding box of the foreground singleton.

12. The method of claim 11, wherein the determining of the predetermined point as a vanishing point comprising:
applying the angle between the reference vector and the eigenvector to an error function; and
determining the predetermined point as the vanishing point when the angle minimizes an error from the error function.

13. The method of claim 11, further comprising:
calculating a location of the vanishing point by repeatedly setting all or a portion of pixels in the acquired image as the predetermined point.

14. The method of claim 11, wherein the generating of the single foreground image of the at least one singleton comprises
generating a background model by designating pixels unchanged between a plurality of images, as background pixels;
comparing the image acquired by the singleton selector with the background model;
determining pixels other than the background pixels corresponding to the background model as a foreground pixel; and
generating the single foreground image using the foreground pixels.

* * * * *